United States Patent Office

3,206,497
Patented Sept. 14, 1965

3,206,497
PURIFICATION OF NITRILES
Alex G. Oblad, Short Hills, N.J., assignor to Pullman
Incorporated, a corporation of Delaware
No Drawing. Filed Apr. 24, 1961, Ser. No. 104,782
15 Claims. (Cl. 260—465.2)

This invention relates to an improved process for the purification of nitrile materials and more specifically, the invention relates to the separation of a nitrile from a mixture containing other nitrogen-containing compounds of basic character.

The organic nitriles are important articles of commerce which are particularly useful in the preparation of insecticides, gelling agents, resins and wetting agents. They may be hydrogenated to valuable aliphatic amines by subjecting them to catalytic hydrogenation at temperatures between about 25° C. and about 200° C. under superatmospheric pressures using, for example, a nickel catalyst in the hydrogenation. Certain nitriles, such as acrylonitrile, are valuable monomers in a polymerization with butadiene to produce synthetic rubber of the N-Buna type. Adiponitrile has been used as an ingredient or intermediate in the preparation of nylon.

One of the most commercially acceptable methods for the preparation of these nitriles is the reaction of a fatty acid or its ester derivative with ammonia, usually in the presence of a dehydrating catalyst. This method is particularly well suited to the production of a nitrile having a long carbon chain with minimum tar and polymer formation.

One of the major disadvantages, however, connected with this process is the production of a reaction mixture containing, in addition to the nitrile, nitrogen-containing, emulsion forming by-products which are difficult to separate from the product and which, therefore, reduce the amount of product recoverable from the process. Furthermore, in some instances, the emulsion forming by-product is a valuable chemical and must be recovered for use in other processes. Therefore, methods which would effect its removal, but decompose the by-product, must be avoided.

It is, therefore, an object of the present invention to overcome the difficulties mentioned above.

Another object of the present invention is to provide a commercially feasible method of purifying the nitrile product in admixture with basic nitrogen-containing compounds.

Another object of this invention is to provide an economic and simple method of recovering and purifying emulsion forming by-products which are present in admixture with nitrile materials.

Still another object of this invention is to enhance the yield of the nitrile product from the synthesis reactor wherein ammonia is reacted with a compound containing a R—COO— group or an organic carbonyl oxy compound.

These and other objects will become apparent to those skilled in the art from the accompanying description and disclosure.

According to the present invention, the reaction effluent from a nitrile synthesis reaction, which contains in addition to the desired nitrile, water and basic degradation products and by-products of the reaction, is passed into a concentrated solution of a metal chloride and/or a metal bromide wherein the metal is selected from the group consisting of iron, zinc, mercury, copper, antimony and mixtures of these chlorides and/or bromides. The basic by-product forms a complex with the metal halide in the solution and is separated by precipitation, while the desired nitrile product, which is unaltered, remains in the liquid layer and can thus be separated from the contaminating precipitant. Instances where it is desirable to recover the basic nitrogen-containing by-product as, for example, in the case where pyridine, aniline or ammonium oleate (a valuable cosmetic cream emulsifier) is present, the complex compound is washed with an acid, preferably a dilute solution of an inorganic acid, such as, for example sulfuric, nitric, hydrochloric, to solubilize an acid salt of the nitrogen base. The salt is then separated from this solution in any convenient manner, for example, by the addition of a basic solution, such as sodium hydroxide, followed by distillation.

When the nitriles formed in the synthesis zone are aliphatic, they are dehydrated prior to complexing. With cyclic nitriles, water can be tolerated; however, in order to minimize the volume of material treated in the complexing zone, the water can be decanted from the cyclic mixture and/or the organic mixture passed to a drying tower containing a drying agent, e.g., alumina, silica, aluminum phosphate, etc.

Generally the organic carbonyloxy compound useful in the process for the preparation of a nitrile is a fatty acid and/or an ester derivative of a fatty acid. The fatty acids include, for example acetic, propionic, butyric, valeric, stearic, capric, lauric, myristic, palmitic, oleic, sorbic, linoleic, linolinic, acrylic, crotonic, erucic, propiolic, palmitolic, adipic, heptoic, and isovaleric acid. Aryl alkyl acids such as, for example, phenyl acetic and hydrocinnamic acids, may be employed as starting materials and mixtures of acids such as those found in naturally occurring fats such as palm oil, coconut oil, tallow, lard, arachis oil and synthetic mixtures of acids deriving from petroleum oils and paraffin wax can also be employed. Fatty acids containing OH— groups, e.g., lactic acid, leucinic acid, etc., are found to produce unsaturated nitriles when reacted with ammonia or ammonia-type compounds. Acrylonitrile, a valuable member of the nitrile group can be prepared by the reaction of acrylic acid with ammonia. The preferred members of the above group are the fatty acids containing between about 3 and about 20 carbon atoms.

Among the esters which can be employed to produce nitriles are butyl, propyl, ethyl and methyl esters of acetic, butyric, myristic, benzoic, linoleic, oleic, lauric, palmitic, and stearic acids. These organic carbonyloxy compounds, or compounds containing an alkyl-COO— group, are subjected to treatment with ammonia, an amine or other nitrogen-containing compound which, under the conditions of the reaction, provide a source of ammonia (e.g. urea).

Preferred of the amine reactants are the primary aliphatic amines such as methyl, ethyl, propyl and butyl primary amines employed individually or in combination; although it should be understood that a secondary amine, e.g., dimethyl amine can be used, if desired. Among the above ammonia-type reactants, unsubstituted ammonia is most preferred either alone or in admixture with amine or ammonia generating compounds.

The synthesis reaction is carried out at a temperature of between about 300° C. and about 560° C.; preferably between about 350° C. and about 500° C. with an ammonia and/or amine to acid ratio of between about 1:1 and between about 10:1, preferably with an excess of the ammonia or amine, at a contact time of from 2 seconds to about 5 minutes or longer, if desired.

Generally, it has been found that when the reaction is carried out at temperatures between about 300° C. and about 400° C., the nitrile product is the corresponding derivative of the acid or ester starting material with respect to the number of carbon atoms. However, this derivative may be cyclic or linear irrespective of the linear or cyclic character of the starting material. When the synthesis is performed at 420° C. or above, "cracking" of the carbon chain takes place to produce nitriles of smaller chain length or lower molecular weight cyclic compounds and, in many cases, unsaturated chains are produced. Thus, one modification in the synthesis of nitriles is the treatment of a long chain nitrile (as the starting material) with ammonia or an amine at temperatures between about 420° C. to about 500° C. to produce nitrile products of lower molecular weight and unsaturated nitriles such as, for example, acrylonitrile and alkyl-substituted acrylonitriles.

The reaction is also usually conducted in the presence of a supported or unsupported dehydrating catalyst derived from elements in the third, fourth, fifth, sixth or eighth groups of the Periodic Table. Preferred of this group are the dehydrating oxides of cerium, iron, osmium, tungsten, titanium, molybdenum, vanadium, silicon, thorium, and aluminum. Salts such as alums, pumice, boron phosphate and basic aluminum salts may also be used in this capacity. Of this group, silica and alumina and mixtures thereof, as found in bauxite, montmorillonite, etc., are most preferred.

Although the particular form in which the catalyst is used is not critical, it has been found expedient to employ the catalyst as hard porous, non-crystalline gels. The preferred group of catalysts are economically advantageous since they can be regenerated by a simple and inexpensive method, namely by burning-off carbonaceous deposits and dehydrating in a stream of oxygen-containing gas at elevated temperature and this process can be carried out in situ or in a separate furnace to restore the original activity of the catalyst.

After the nitrile products have been formed in the reaction zone, the vaporous or liquid reaction effluent is removed therefrom and, according to the process of the present invention, preferably, but not necessarily, dried in a drying zone. The dried or undried material, if still a vapor, is condensed and the condensate or liquid is preferably passed to a stripping zone wherein ammonia vapor is separated from a liquid mixture containing the desired nitrile and basic nitrogen-containing contaminants. In cases where low boiling nitrogen-containing contaminants having boiling points substantially below the desired nitrile are present, they may also be removed as a vapor with the ammonia. The stripped liquid is then passed into a complexing zone. It is to be understood, however, that if desired, the stripping operation can be by-passed, but for reasons of economy and for ease of recovering ammonia for recycle, stripping is preferred. The complexing zone contains a concentrated solution or slurry of a metal halide selected from the group consisting of ferric chloride, zinc chloride, mercuric chloride, antimonic chloride or copper chloride and/or the corresponding bromides. The chlorides are present in solution in a concentration of between about 0.1 percent and saturation; although, solutions approaching saturation are preferred. While the solution or slurry is preferably aqueous, other solvents can be employed to replace water completely or in part to form the concentrated metal chloride solution. As explained above, in cases where the basic nitrogen-containing contaminants are non-cyclic compounds, e.g., dodecyl amine, water is replaced by a non-polar solvent. Examples of other solvents or slurrying agents which are suitable for replacing water include: ether, chloroform, cyclohexane and benzene; and any other solvent which is inert and immiscible with regard to the reaction mixture and liquid at the temperature employed in the complexing zone in which the solution is maintained.

The complexing zone containing the concentrated metal chloride is maintained at a temperature below 500° C., preferably below 350° C. and most preferably at ambient temperature. The pressure in this zone may vary between 0.1 atmosphere and about 5 atmospheres, although atmospheric pressure is generally preferred. In this zone, it has been found beneficial to supply agitation means to insure a thorough mixture of the reaction effluent with the concentrated solution.

The basic materials which can be present in the nitrile effluent mixture include pyridine, ammonium salts, such as, for example ammonium oleate, particularly when oleic acid is employed as a starting material; cyclic compounds, for example quinoline, pyrrole, indole, miazine, pyrrolidine, gramine, betaine, hexamethylene diamine, pentamethylene diamine, and terpeneamines such as phenylamine, fenchylamine, carvakrylamine, etc. Since some of these materials can be used in the manufacture of drugs and resins, it is desirable that, after separation from the nitrile product, they be recovered.

These basic nitrogen-containing contaminants form a complex compound with the metal chloride or bromides to produce a precipitate which settles to the bottom of the complexing zone. The liquid material is then removed from the zone and pure nitrile product is separated therefrom by simple drying, fractionation, or vaporization followed by fractional condensation.

It is noted that the nitrile mixture from the reactor, upon condensation when in a vaporous state, forms two layers, namely a water layer and a non-aqueous liquid organic layer containing the nitrile and other nitrogen-containing materials. As set forth above, this organic layer is preferably decanted before introduction of the nitrile mixture into the complexing zone. When the water layer is not separated and the reactor effluent is passed to the complexing zone, the precipitate of the basic nitrogen-containing compound and the metal halide settles to the bottom of the zone and a water layer superimposed by the liquid nitrile layer forms in the zone. The liquid layers are separated and the nitrile recovered as the product of the process.

According to this process, the precipitate material separated in the complexing zone can be passed to a scrubbing zone wherein it is washed with an acid, preferably hydrochloric acid of between about 5 percent and about 40 percent concentration for breaking the complex and dissolving the basic nitrogen-containing compound as a soluble hydrogen chloride. The basic material can then be recovered, i.e., by neutralization folowed by distillation. As an alternative, the precipitated material can be washed directly with a strong base such as, for example sodium hydroxide, and purified by distillation.

The above process is carried out in metal equipment which does not interfere with the reactions and which is corrosion resistant. Nickel equipment has been found highly suitable for this purpose, although other material such as, for example aluminum may also be employed, if desired.

The following examples are presented for a better understanding of the present invention and are not to be construed as unnecessarily limiting to the scope thereof.

*Example 1*

Into a vertical nickel reaction tube is charged 100 cc. of about 12 mesh silica gel catalyst. The reactor is heated to a temperature of about 440° C. Ammonia preheated to 450° C., is passed into the reactor at a rate of about 0.5 mol per hour. Commercial stearic acid, which contains a mixture of stearic and palmitic acids, is vaporized and passed into the reactor at a rate of about 0.2 mol per hour. In the reactor, the acids are converted to the corresponding nitriles, namely stearic nitrile and palmitic nitrile. The vaporous reactor effluent, which is withdrawn from the reactor contains, in addition to stearic and palmitic nitrile, water and amines having lower carbon content than the nitrile. The reactor effluent is dried with bauxite and condensed. The resulting liquid is then stripped to remove ammonia and passed to a complexing zone containing 10 percent cupric chloride in an ether slurry at room temperature under atmospheric pressure. The resulting mixture is agitated by means of a stirrer and a precipitate is allowed to form in the lower portion of the complexing zone. The liquid material is separated from the precipitate and fractionated to recover and separate pure stearic nitrile from palmitic nitrile. The nitriles are recovered in about 75 percent yield based on the reactants in the reaction zone.

Example 2

Into an aluminum reaction vessel containing pumice and maintained at a temperature of about 400° C., is introduced a stream of ammonia at a rate of about 51.9 grams per hour and 2700 grams of vaporous caproic acid. The ammonia is reacted with the acid over a period of about two hours and effluent vapors removed from the top of the reactor are condensed. The condensate, cooled to a temperature of about 80° C., separates into two immiscible layers, namely a water layer and an organic layer. The water layer is decanted and the organic layer is then passed and stirred into an ether slurry containing 10 percent of antimony chloride whereupon a complex compound precipitate of the basic nitrogen-containing by-products of the nitrile synthesis reaction are formed with the metal chloride. The supernatant liquid, free of basic nitrogen-containing compounds, is filtered from the precipitate and distilled to recover pure capronitrile in about 85 percent yield.

Example 3

Into a reactor, maintained at a temperature of about 380° C. containing alumina gel catalyst, is introduced ammonia and oleic acid in a mol ratio of about 8:1. After about 15 minutes, a vaporous effluent containing oleonitrile is withdrawn from the reactor together with water, ammonia and a small amount of basic nitrogen-containing by-products such as ammonium oleate and octadecylamine. The effluent gases are partially condensed to remove all of the ammonia and oleic acid and at least a major portion of the water as vapors. The condensate is then introduced, with stirring, into a saturated ferric chloride-ether solution, maintained at ambient temperature under atmospheric pressure. Upon introduction of the condensate into the solution, a precipitate begins to form and, after about 15 minutes, the liquid material, free of basic nitrogen-containing compounds, is recovered from the liquid by distillation in about 90 percent yield.

The precipitate is washed with an equal portion (based on the amount of ferric chloride employed) of strong base, namely sodium hyroxide in about 10 percent concentration, and the respective amines are separated from the mixture by distillation.

Example 4

Into a reactor containing thoria catalyst maintained at a temperature of about 305° C., is passed liquid arachidic acid and n-hexylamine in a mol ratio of about 1:3. Water is continuously removed from the reactor during the reaction with montmorillonite. After the arachidonitrile is formed the effluent liquid is withdrawn from the system and passed directly into a 10 percent cupric chloride-ether slurry wherein the liquid mixture is agitated. A precipitate comprising the complex salt of arachidoamine and other basic nitrogen-containing compounds with the metal chloride complexing agent is formed. The supernatant liquid is withdrawn from the precipitate and fractionated to recover the arachidonitrile in about 80 percent yield.

Example 5

Vaporized benzoic acid and ammonia are passed in a mol ratio of about 1:5 into a reactor maintained at about 460° C. and containing a series of thoria catalyst beds. The reaction of acid and ammonia to produce benzonitrile, analine, water and diphenylamine takes place as the vapors pass from the bottom of the reactor upwardly through said catalyst beds. The vapors are removed from the top of the reaction zone and partially condensed in order to separate ammonia and other low boiling compounds as vapors. The ammonia is then recycled to the reactor. In the condensate, two immiscible liquid layers are formed namely, an aqueous layer and an organic layer. The aqueous layer is decanted and the organic layer is passed to a bath of saturated aqueous solution of cupric chloride whereupon a precipitate of complex compounds formed from analine and diphenylamine with the metal chloride is obtained. The supernatant liquid, free of basic nitrogen-containing compounds, is withdrawn, dried and vaporized to recover pure benzonitrile as a product of the process in about 90 percent yield. The analine and diphenyl complexes are recovered by dissolving the precipitate with hydrochloric acid and then treating with a strong base such as sodium hydroxide to decompose the acid salt. The valuable nitrogen-containing compounds are then separated from the resulting solution by distillation.

The above examples illustrate some of the various methods for separating nitriles from nitrile-containing mixtures; however, it is to be understood that many other combinations and variations are included in the scope of this invention in accordance with the general description. For example, a high molecular weight nitrile, e.g., octadecyl nitrile, can be subjected to cracking at a temperature of about 500° C. to produce a lower molecular weight nitrile, e.g., decyl nitrile, in admixture with a nitrogen-containing by-product, e.g., octyl amine. It is also to be understood that any of the fatty acids or esters mentioned above can be substituted in any of the preceding examples to effect the synthesis of the nitrile described and any of the ammonia type reactants recited above in like manner can be substituted in any of the examples to provide the nitrile product in good yield. Also, the corresponding bromide of any of the metal chloride complexing agents may be substituted in any of the above examples to provide good results.

Having thus described my invention I claim:

1. A process for recovering a nitrile from a mixture of a hydrocarbon nitrile and a basic nitrogen-containing compound, obtained from the reaction of a carbonyl oxy compound selected from the group consisting of an acid and ester with a compound selected from the group consisting of an amine, ammonia, and a nitrogen-containing compound which, under the conditions of the reaction, provides a source of ammonia, which comprises: passing the mixture into a concentrated solution of a metal halide selected from the group consisting of ferric chloride, zinc chloride, mercuric chloride, copper chloride, antimony chloride and the corresponding bromides of these compounds and mixtures thereof wherein the solvent is a liquid which is inert and immiscible with the reaction mixture containing the nitrile product, reacting the basic, nitrogen-containing compound with the metal halide and recovering the unreacted nitrile from the mixture.

2. The process of claim 1 wherein the nitrile is an aliphatic nitrile and wherein the nitrile mixture is dehydrated and passed into an anhydrous metal halide solution.

3. The process of claim 1 wherein the nitrile mixture is reacted with an aqueous solution of the metal halide.

4. A process for recovering a nitrile from a mixture of a hydrocarbon nitrile, water, and a basic nitrogen-containing compound obtained from the reaction of a carbonyl oxy compound selected from the group consisting of an acid and an ester with a compound selected from the group consisting of an amine, ammonia and a nitrogen-containing compound which, under the conditions of the reaction, provides a source of ammonia, which comprises: decanting a water layer from the liquid mixture, passing the remaining liquid organic layer into a 0.1 percent to saturated solution of a metal halide selected from the group consisting of ferric chloride, zinc chloride, mercuric chloride, copper chloride, antimonic chloride and the corresponding bromides of these compounds and mixtures thereof and wherein the solvent of the solution is a liquid which is inert and immiscible with the mixture, reacting the basic nitrogen-containing compound with metal halide to form a precipitate and recovering the unreacted nitrile from the supernatant liquid.

5. The process of claim 4 wherein the solvent is a non-polar liquid.

6. A process for recovering a nitrile from a mixture of a hydrocarbon nitrile, water, ammonia, and a basic nitrogen-containing compound obtained from the reaction of a carbonyl oxy compound selected from the group consisting of an acid and an ester with a compound selected from the group consisting of an amine, ammonia, and a nitrogen-containing compound which, under the conditions of the reaction, provides a source of ammonia, which comprises: dehydrating the liquid nitrile mixture, stripping ammonia from the anhydrous liquid mixture, passing the stripped liquid into a concentrated solution of metal halide selected from the group consisting of ferric chloride, zinc chloride, mercuric chloride, copper chloride, antimonic chloride and the corresponding bromides of these compounds and mixtures thereof and wherein the solvent of the solution is a liquid which is inert and immiscible with the mixture, agitating the resulting mixture, reacting the basic nitrogen-containing compound with the metal halide to form a precipitate and recovering the unreacted nitrile from the supernatant liquid.

7. The process of claim 6 wherein water is a solvent for the metal halide.

8. The process of claim 6 wherein diethyl ether is a solvent for the metal halide.

9. The process of claim 6 wherein chloroform is a solvent for the metal halide.

10. The process of claim 6 wherein benzene is a solvent for the metal halide.

11. The process of claim 6 wherein the ammonia stripped from the nitrile mixture is recycled to the reaction zone.

12. The process of claim 6 wherein the carbonyloxy compound is a fatty acid.

13. The process of claim 6 wherein the carbonyloxy compound is an ester derivative of a fatty acid.

14. The process of claim 6 wherein the complexing zone is maintained at ambient temperature under atmospheric pressure.

15. A process for recovering a nitrile from a mixture of a hydrocarbon nitrile, water, ammonia, and a basic nitrogen-containing compound obtained from the reaction of a carbonyloxy compound selected from the group consisting of an acid and an ester with a compound selected from the group consisting of an amine, ammonia, and a nitrogen-containing compound which, under the conditions of the reaction, provides a source of ammonia, which comprises: dehydrating the liquid nitrile mixture, stripping ammonia from the anhydrous liquid mixture, passing the stripped liquid into a concentrated solution of metal halide selected from the group consisting of ferric chloride, zinc chloride, mercuric chloride, copper chloride, antimonic chloride and the corresponding bromides of these compounds and mixtures thereof and wherein the solvent of the solution is a liquid which is inert and immiscible with the mixture, agitating the resulting mixture, reacting the basic nitrogen-containing compound with the metal halide to form a precipitate, recovering the unreacted nitrile from the supernatant liquid, recovering the basic nitrogen-containing compound by washing the precipitate with a 5 percent to 40 percent solution of an inorganic acid, neutralizing the resulting liquid and distilling the basic nitrogen-containing compound from the mixture.

References Cited by the Examiner
UNITED STATES PATENTS

| 1,991,955 | 2/35 | Ralston | 260—465.2 |
| 2,553,008 | 5/51 | Sager | 260—465.3 |
| 2,937,178 | 5/60 | Warner | 260—465.1 X |

OTHER REFERENCES

Cyanamid, "The Chemistry of Acrylonitrile," second edition, 1959, page 10.

Migrdichian: "The Chemistry of Organic Cyanogen Compounds," 1947, page 11.

CHARLES B. PARKER, *Primary Examiner.*